(12) United States Patent
Mehta et al.

(10) Patent No.: US 12,217,169 B2
(45) Date of Patent: Feb. 4, 2025

(54) LOCAL NEURAL IMPLICIT FUNCTIONS WITH MODULATED PERIODIC ACTIVATIONS

(71) Applicant: ADOBE INC., San Jose, CA (US)

(72) Inventors: Ishit bhadresh Mehta, San Diego, CA (US); Michaël Gharbi, San Francisco, CA (US); Connelly Barnes, Seattle, WA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 1001 days.

(21) Appl. No.: 17/198,670

(22) Filed: Mar. 11, 2021

(65) Prior Publication Data

US 2022/0292341 A1    Sep. 15, 2022

(51) Int. Cl.
| | | |
|---|---|---|
| *G06N 3/04* | (2023.01) | |
| *G06N 3/0455* | (2023.01) | |
| *G06N 3/048* | (2023.01) | |
| *G06N 3/08* | (2023.01) | |
| *G06T 3/4007* | (2024.01) | |
| *G06T 5/77* | (2024.01) | |

(52) U.S. Cl.
CPC ............. *G06N 3/08* (2013.01); *G06N 3/0455* (2023.01); *G06N 3/048* (2023.01); *G06T 3/4007* (2013.01); *G06T 5/77* (2024.01); *G06T 2207/10016* (2013.01)

(58) Field of Classification Search
CPC ........ G06N 3/045; G06N 3/0455; G06T 5/77; G06T 3/4007
See application file for complete search history.

(56) References Cited

U.S. PATENT DOCUMENTS

2023/0419082 A1* 12/2023 Yuan .................... G06N 3/0464

OTHER PUBLICATIONS

Niklaus, Simon, Long Mai, and Feng Liu. "Video frame interpolation via adaptive convolution." Proceedings of the IEEE conference on computer vision and pattern recognition. 2017. (Year: 2017).*
Li, Yangyan, et al. "Fpnn: Field probing neural networks for 3d data." Advances in neural information processing systems 29 (2016). (Year: 2016).*
Si, Jiong, Sarah L. Harris, and Evangelos Yfantis. "A dynamic ReLU on neural network." 2018 IEEE 13th Dallas Circuits and Systems Conference (DCAS). IEEE, 2018. (Year: 2018).*

(Continued)

*Primary Examiner* — Hal Schnee
(74) *Attorney, Agent, or Firm* — CHAU & ASSOCIATES, LLC

(57) ABSTRACT

Systems and methods for signal processing are described. Embodiments receive a digital signal comprising original signal values corresponding to a discrete set of original sample locations, generate modulation parameters based on the digital signal using a modulator network, wherein each of a plurality of modulator layers of the modulator network outputs a set of the modulation parameters, and generate a predicted signal value of the digital signal at an additional location using a synthesizer network, wherein each of a plurality of synthesizer layers of the synthesizer network operates based on the set of the modulation parameters from a corresponding modulator layer of the modulator network.

17 Claims, 7 Drawing Sheets

(56) References Cited

OTHER PUBLICATIONS

Chen, Je-Chian, and Yu-Min Wang. "Comparing activation functions in modeling shoreline variation using multilayer perceptron neural network." Water 12.5 (2020): 1281. (Year: 2020).*
1 Atzmon et al., "SAL: Sign Agnostic Learning of Shapes from Raw Data", In Proceedings of the IEEE/CVF Conference on Computer Vision and Pattern Recognition, pp. 2565-2574, 2020.
2 Bi, et al, "Deep Reflectance vols. Relightable Reconstructions from Multi-View Photometric Images", arXiv preprint: arXiv:2007.09892v1 [cs.CV] Jul. 20, 2020, 21 pages.
3 Chabra, et al., "Deep Local Shapes: Learning Local SDF Priors for Detailed 3D Reconstruction", arXiv preprint: arXiv:2003.10983v3 [cs.CV] Aug. 21, 2020, 26 pages.
4 Chen et al., "Learning Implicit Fields for Generative Shape Modeling", In Proceedings of the IEEE Conference on Computer Vision and Pattern Recognition, pp. 5939-5948, 2019.
5 Davies, et al., "Overfit Neural Networks as a Compact Shape Representation", arXiv preprint: arXiv:2009.09808v2 [cs.GR] Oct. 12, 2020, 9 pages.
6 Glorot, et al., "Understanding the difficulty of training deep feedforward neural networks", In Proceedings of the thirteenth international conference on artificial intelligence and statistics, pp. 249-256, 2010.
7 Ha, et al., "HyperNetworks", arXiv preprint: arXiv:1609.09106v4 [cs:LG] Dec. 1, 2016, 29 pages.
8 Jiang, et al., "Local Implicit Grid Representations for 3D Scenes", In Proceedings of the IEEE/CVF Conference on Computer Vision and Pattern Recognition, pp. 6001-6010, 2020.
9 Klocek, et al., "Hypernetwork functional image representation", In International Conference on Artificial Neural Networks, arXiv:1902.10404v3 [cs.LG] Jun. 3, 2019, pp. 496-510, Springer.
10 Lapedes et al., "Nonlinear Signal Processing Using Neural Networks: Prediction and System Modelling", Technical report, 1987, 52 pages.
11 Liu, et al., "Neural Sparse Voxel Fields", Advances in Neural Information Processing Systems, 33, 2020, arXiv:2007.11571v2 [cs.CV] Jan. 6, 2021, 22 pages.
12 Liu, et al., "Deep Learning Face Attributes in the Wild", In Proceedings of International Conference on Computer Vision (ICCV), Dec. 2015, pp. 3730-3738.
13 Lombardi, et al., "Neural Volumes: Learning Dynamic Renderable vols. from Images", arXiv preprint: arXiv:1906.07751v1 [cs.GR] Jun. 18, 2019, 14 pages.
14 Lorensen et al., "Marching Cubes: a High Resolution 3D Surface Construction Algorithm", ACM siggraph computer graphics, 21(4):163-169, 1987.
15 Mahajan, et al., "A Theory of Locally Low Dimensional Light Transport", In ACM SIGGRAPH 2007 papers, pp. 62-1-62-10, 2007.
16 Mildenhall, et al., "NeRF: Representing Scenes as Neural Radiance Fields for View Synthesis", arXiv preprint: arXiv:2003.08934v2 [cs.CV] Aug. 3, 2020, 25 pages.
17 Bemana, et al., "X-Fields: Implicit Neural View-, Light- and Time-Image Interpolation", ACM Transactions on Graphics (Proc. SIGGRAPH Asia 2020), 39(6), 2020, pp. 257:1-257:15.
18 Mordvintsev, et al., "Differentiable Image Parameterizations", Distill, 2018, 27 pages.
19 Niemeyer, et al., "Differentiable Volumetric Rendering: Learning Implicit 3D Representations without 3D Supervision", In Proceedings of the IEEE/CVF Conference on Computer Vision and Pattern Recognition, pp. 3504-3515, 2020.
20 Olah, et al., "Feature Visualization", Distill, 2017, 19 pages.
21 Parascandolo, et al., "Taming the Waves: Sine as Activation Function in Deep Neural Networks", 2016, 12 pages.
22 Park, et al., "DeepSDF: Learning Continuous Signed Distance Functions for Shape Representation", In Proceedings of the IEEE Conference on Computer Vision and Pattern Recognition, pp. 165-174, 2019.
23 Radford, et al., "Unsupervised Representation Learning With Deep Convolutional Generative Adversarial Networks", arXiv preprint: arXiv:1511.06434v2 [cs.LG] Jan. 7, 2016, 16 pages.
24 Schwarz, et al., "GRAF: Generative Radiance Fields for 3D-Aware Image Synthesis", arXiv preprint: arXiv:2007.02442v3 [cs.CV] Dec. 15, 2020, 13 pages.
25 Shi, et al., "A Benchmark Dataset and Evaluation for Non-Lambertian and Uncalibrated Photometric Stereo", In Proceedings of the IEEE Conference on Computer Vision and Pattern Recognition, pp. 3707-3716, 2016.
26 Sitzmann, et al., "MetaSDF: Meta-learning Signed Distance Functions", Advances in Neural Information Processing Systems, 33, arXiv:2006.09662v1 [cs.CV] Jun. 17, 2020, 17 pages.
27 Sitzmann, et al., "Implicit Neural Representations with Periodic Activation Functions", arXiv preprint: arXiv:2006.09661v1 [cs.CV] Jun. 17, 2020, 35 pages.
28 Sitzmann, et al., "DeepVoxels: Learning Persistent 3D Feature Embeddings", In Proc. Computer Vision and Pattern Recognition (CVPR), IEEE, 2019, pp. 2437-2446.
29 Sitzmann, et al., "Scene Representation Networks: Continuous 3D-Structure-Aware Neural Scene Representations", In Advances in Neural Information Processing Systems, arXiv:1906.01618v2 [cs.CV] Jan. 28, 2020, pp. 1121-1132.
30 Sopena, et al., "Neural networks with periodic and monotonic activation functions: a comparative study in classification problems", 1999, 6 pages.
31 Stanley, "Compositional pattern producing networks: A novel abstraction of development", 8(2):131-162, 2007.
32 Tancik, et al., "Fourier Features Let Networks Learn High Frequency Functions in Low Dimensional Domains", arXiv preprint: arXiv:2006.10739v1 [cs.CV] Jun. 18, 2020, 24 pages.
33 Thies, et al., "Deferred Neural Rendering: Image Synthesis using Neural Textures", ACM Transactions on Graphics (TOG), 38(4):1-12, arXiv:1904.12356v1 [cs.CV] Apr. 28, 2019.
34 Vaswani, et al., "Attention Is All You Need", In Advances in neural information processing systems, pp. 5998-6008, arXiv:1706.03762v5 [cs.CL] Dec. 6, 2017.
35 Wood, et al., "Surface light fields for 3D photography", In Proceedings of the 27th annual conference on Computer graphics and interactive techniques, pp. 287-296, 2000, 136 pages.
36 Xue, et al., "Video Enhancement with Task-Oriented Flow", International Journal of Computer Vision (IJCV), 127 (8):1106-1125, arXiv:1711.09078v3 [cs.CV] Nov. 10, 2019.
37 Zhou, et al., "Thingi10K: A Dataset of 10,000 3D-Printing Models", arXiv preprint: arXiv:1605.04797v2 [cs.GR] Jul. 2, 2016, 8 pages.
38 Mescheder, et al., "Occupancy Networks: Learning 3D Reconstruction in Function Space", In Proceedings of the IEEE/CVF Conference on Computer Vision and Pattern Recognition (CVPR), Jun. 2019, pp. 4460-4470.

* cited by examiner

LOCAL NEURAL IMPLICIT FUNCTIONS WITH MODULATED PERIODIC ACTIVATIONS

BACKGROUND

The following relates generally to signal processing, and more specifically to signal processing using continuous representations.

Signal processing refers to analyzing, modifying, and synthesizing signals such as audio, images, videos, and other measurements. Signal processing techniques can be used to improve transmission, storage efficiency and signal quality and decompose certain components in a measured signal. Digital signal processing is a sub-category of signal processing. Digital signal processing is the processing of digitized (i.e., discrete or time sampled) signals. General-purpose computers or digital circuits such as application specific integrated circuits (ASICs), field-programmable gate arrays or specialized digital signal processors (DSP chips) may be used for digital signal processing.

In some cases, signal processing may be performed by neural networks. For example, a signal processing network may represent a model of signal that may be used for predicting values of the signal that aren't represented in the original signal. In some examples, signal processing networks provide functional representations using neural implicit functions. These neural implicit functions include multi-layer perceptrons (MLPs) with nonlinear function activations such as sigmoid, tanh, or rectified linear unit (ReLU) functions.

However, such signal processing networks are not able to faithfully represent high frequency content (e.g., the fine details of an image). Therefore, there is a need in the art for an improved signal processing system that is efficient in reconstructing high-frequency components of the target signal.

SUMMARY

The present disclosure describes systems and methods for signal processing. One or more embodiments of the disclosure provide a signal processing apparatus trained using machine learning techniques to create a continuous representation of the signal. The continuous representation can be used to generate a high-resolution target signal (e.g., images, videos, and shapes). In some examples, a signal processing network includes a synthesizer network and a modulator network. The modulator network may include multiple multi-layer perceptron (MLP) layers with rectified linear unit (ReLU) activation, while the synthesizer network may include MLP layers with periodic function activations (e.g., sine functions). The modulator network generates modulation parameters to modulate amplitude, phase, and/or frequency of intermediate layers of the synthesizer network.

A method, apparatus, and non-transitory computer readable medium for signal processing are described. One or more embodiments of the method, apparatus, and non-transitory computer readable medium include receiving a digital signal comprising original signal values corresponding to a discrete set of original sample locations, generating modulation parameters based on the digital signal using a modulator network, wherein each of a plurality of modulator layers of the modulator network outputs a set of the modulation parameters, and generating a predicted signal value of the digital signal at an additional location using a synthesizer network, wherein each of a plurality of synthesizer layers of the synthesizer network operates based on the set of the modulation parameters from a corresponding modulator layer of the modulator network.

An apparatus and method for signal processing are described. One or more embodiments of the apparatus and method include a modulator network comprising a plurality of modulator layers, wherein each of the plurality of modulator layers of the modulator network is configured to output a different set of modulation parameters based on a same digital signal and a synthesizer network comprising a plurality of synthesizer layers, wherein the synthesizer network represents a continuous function of a signal parameter of the digital signal, and wherein each of the synthesizer layers is configured to receive the set of modulation parameters from a corresponding modulator layer of the modulator network.

A method, apparatus, and non-transitory computer readable medium for training a neural network are described. One or more embodiments of the method, apparatus, and non-transitory computer readable medium include receiving a digital signal comprising original signal values corresponding to a discrete set of original sample locations, generating modulation parameters based on the digital signal using a modulator network, wherein each of a plurality of modulator layers of the modulator network outputs a set of the modulation parameters, generating a predicted signal value of the digital signal for at least one of the original sample locations using a synthesizer network, wherein each of a plurality of synthesizer layers of the synthesizer network receives the set of the modulation parameters from a corresponding modulator layer of the modulator network, computing a loss function based on the predicted signal value and a value of the original signal values corresponding to the at least one of the original sample locations, and training the modulator network and the synthesizer network based on the loss function.

DETAILED DESCRIPTION

Figure 1:
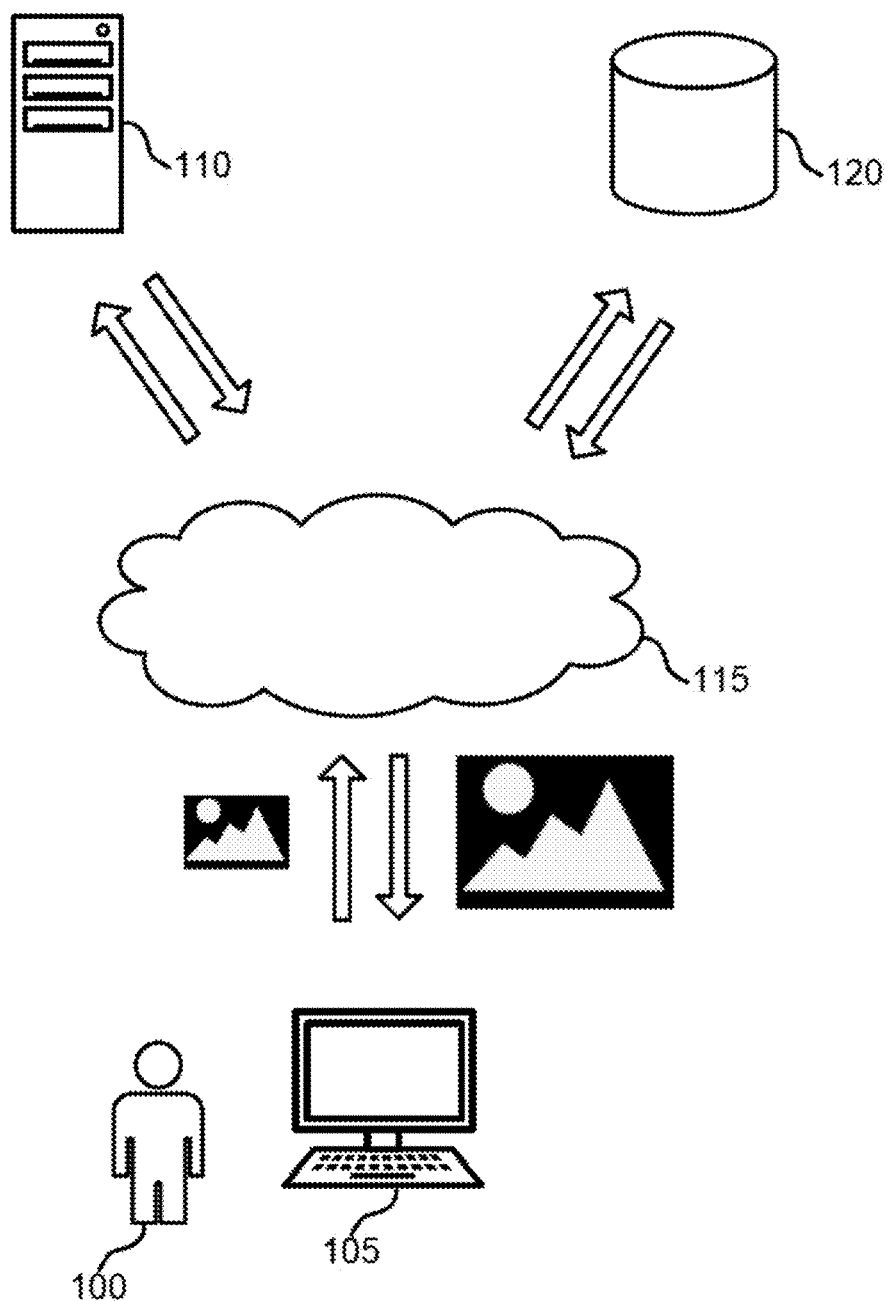
FIG. 1 shows an example of a system for signal processing according to aspects of the present disclosure.

The present disclosure describes systems and methods for signal processing. One or more embodiments of the disclosure synthesize a high-resolution target signal (e.g., images, videos, and shapes) using a neural network. For example, a signal processing network includes a synthesizer network and a modulator network. The modulator network may include multiple multi-layer perceptron (MLP) layers with rectified linear unit (ReLU) activation, while the synthesizer network may include MLP layers with periodic function activations (e.g., sine functions). The modulator network generates modulation parameters to modulate amplitude, phase, and/or frequency of intermediate layers of the synthesizer network.

Complex signals may include images, videos, audio recordings, light-fields, or implicitly defined three-dimensional (3D) shapes. Recently, functional neural representations such as MLPs have been used to approximate these complex signals. For example, signal processing networks have used non-periodic activation functions (e.g., tanh, sigmoid, and ReLU) that are monotonic and quasi-convex, to recognize patterns in training datasets. However, these signal processing networks have been unable to successfully reproduce high frequency signal content (e.g., the fine details of images).

By contrast, one or more embodiments of the present disclosure provide an improved signal processing apparatus including a modulator network and a synthesizer network. In some embodiments, the synthesizer network applies multi-layer perceptrons (MLPs) with periodic activations (e.g., sine), while the modulator network is used to modulate parameters of intermediate layers of the synthesizer network. As a result, the improved signal processing apparatus has increased control over the internal feature maps with variations in phase, amplitude, and frequency. Furthermore, the modulator-synthesizer architecture is computationally efficient.

Accordingly, a modulator network enables embodiments of the present disclosure to condition the functional representations on a latent variable representing the digital signal, so that a single functional model can represent multiple local signals. The improved signal processing network generates modulation parameters to modulate sine activations of the synthesizer network using a modulator network. As a result, the signal processing network can output reconstructed signal at continuous coordinates. For example, the reconstructed signal can encompass high-frequency components of the input signal with increased fidelity and resolution.

In some cases, the signal processing network is trained based on supervised learning techniques. At inference time, the model parameters are fixed, while a new latent vector is optimized for each new tile. Thus, the parameters of the synthesizer network are tuned by different modulator parameters for each signal. In some cases, the network is trained based on unsupervised or self-supervised techniques (e.g., auto-encoder configuration). For example, an optional encoder network is used to predict latent codes (i.e., latent codes are no longer free variables to optimize).

In some examples, a functional representation is defined locally through decomposing an input signal domain into a set of smaller tiles. Accordingly, a digital signal may be decomposed into simple and repetitive local patterns for accurate approximation.

Embodiments of the present disclosure may be used in the context of computer graphics and computer vision (e.g., image, video, shape approximation, generative modeling, synthesis, neural rendering, and audio modeling). For example, a signal processing network based on the present disclosure may be used for single and multi-image encoding, and video approximation. An example of an application of the inventive concept in the image reconstruction context is provided with reference to FIGS. 1 and 2. Examples of a process for signal processing are provided with reference to FIGS. 5 and 6. Details regarding the architecture of an example signal processing apparatus are provided with reference to FIGS. 3 and 4. A description of an example training process is described with reference to FIG. 7.

Image Reconstruction Application

FIG. 1 shows an example of a system for signal processing according to aspects of the present disclosure. The example shown includes user 100, user device 105, signal processing apparatus 110, cloud 115, and database 120. Signal processing apparatus 110 is an example of, or includes aspects of, the corresponding element described with reference to FIG. 3.

In the example of FIG. 1, the user 100 provides an input signal (e.g., an image) to the signal processing apparatus 110, e.g., via the user device 105 and the cloud 115. The signal processing apparatus receives the digital signal, which includes original signal values corresponding to a discrete set of original sample locations (e.g., the pixel coordinates). In some expels, the image may have a relatively low resolution. The signal processing apparatus 110 receives the signal, and generates a latent vector that represents the signal, and outputs a reconstructed signal (i.e., a higher resolution image).

The signal processing apparatus 110 includes a trained signal processing network comprising a modulator network and a synthesizer network. The modulator network is configured to generate modulation parameters based on the digital signal (e.g., an image), wherein each of a plurality of modulator layers of the modulator network outputs a set of the modulation parameters. In some cases, the synthesizer network includes MLP layers with sine function activations. In some examples, the modulator network applies a conditioning mechanism to modulate the frequency, phase, and amplitude of periodic neural activations (i.e., the synthesizer network).

The synthesizer network generates a predicted signal of the image signal. Since the synthesizer represents a continuous function of the signal, it can generate signal values at additional locations not present in the original signal. For example, each of a plurality of synthesizer layers of the synthesizer network may operate based on the set of the modulation parameters from a corresponding modulator layer of the modulator network. The synthesizer network can generate signals that are of higher fidelity, smooth and richly detailed outputs. The output image from the signal processing apparatus has a higher resolution than the image from the user.

The user device 105 may be a personal computer, laptop computer, mainframe computer, palmtop computer, personal assistant, mobile device, or any other suitable processing apparatus. In some examples, the user device 105 includes a signal processing application such as an image editing application. The signal processing application may either include or communicate with the signal processing apparatus 110.

The signal processing apparatus 110 includes a computer implemented network that receives a digital signal comprising original signal values corresponding to a discrete set of original sample locations, generates modulation parameters based on the digital signal using a modulator network, and generates a predicted signal value of the digital signal at an additional location using a synthesizer network. According to some embodiments, the signal processing apparatus 110 includes an encoder, a modulator network, and a synthesizer network.

The signal processing apparatus 110 may also include a processor unit, a memory unit, and a training component. The training component is used to train a signal processing network of the signal processing apparatus 110. Additionally, the signal processing apparatus 110 can communicate with the database 120 via the cloud 115. In some cases, the architecture of the signal processing network is also referred to as a network model. Further detail regarding the architecture of the signal processing apparatus 110 is provided with reference to FIGS. 3 and 4. Further detail regarding the operation of the signal processing apparatus 110 is provided with reference to FIGS. 5 and 6.

In some cases, signal processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
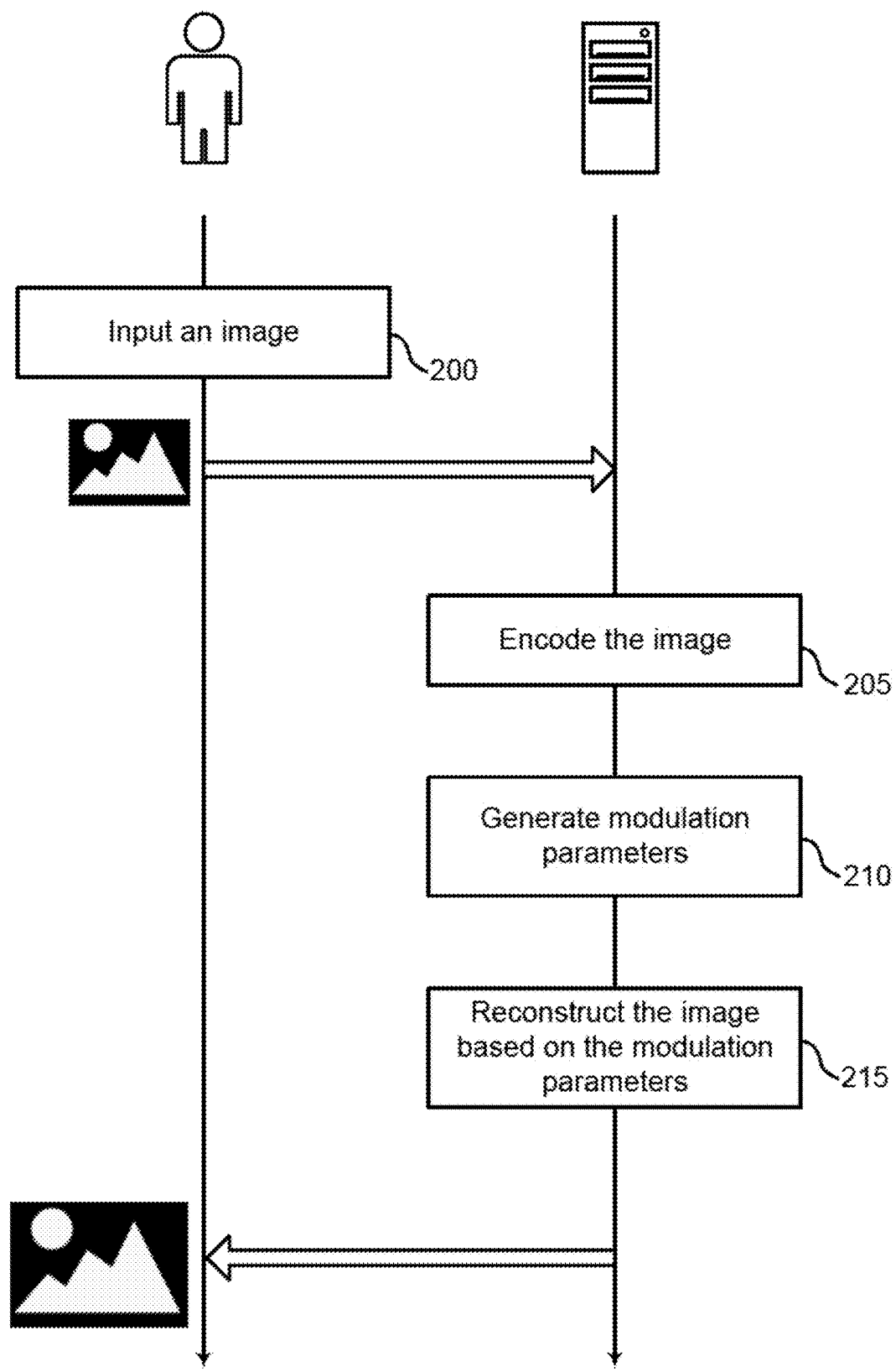
FIG. 2 shows an example of image processing according to aspects of the present disclosure.

FIG. 2 shows an example of image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user inputs an image. In some cases, the operations of this step refer to, or may be performed by, a user device as described with reference to FIG. 1.

In one example, the user inputs an image using a user device (e.g., a laptop device) to a signal processing apparatus. In some embodiments, a signal processing network is trained for single-image approximation tasks. Given samples (pixels) for a single grayscale image, the signal processing network is trained to reconstruct the image. In one example, a 2048×2048 resolution image is divided into a 8×8 grid of tiles (i.e., per-tile fitting).

At operation 205, the system encodes the image (or image tiles). In some cases, the operations of this step refer to, or may be performed by, an encoder as described with reference to FIGS. 3 and 4. In some examples, the system decomposes the domain of signal to approximate into regular tiles. A latent code z is assigned to each tile, and latent codes and network parameters are optimized jointly on the training dataset (auto-decoder setting). In some cases, as an alternative, the system includes an optional encoder network that predicts the per-tile latent codes from the input (auto-encoder setting).

At operation 210, the system generates modulation parameters. In some cases, the operations of this step refer to, or may be performed by, a modulator network as described with reference to FIGS. 3 and 4. In some examples, the system includes a modulator network implemented with a MLP with ReLU activation. The modulator network, along with local decomposition of the signal to approximate, produce a signal processing model with increased expressiveness (e.g., reconstruct high-frequency content, represent fine-details of the image).

The modulator layers process the tile's latent vector, and outputs coefficients (i.e., modulation parameters) to modulate the activations of a synthesizer network that includes continuous activation functions (e.g., periodic activation functions such as sine activation functions or cosine activation functions). The synthesizer network outputs the reconstructed signal value at continuous coordinates x. The signal processing network may be trained end-to-end to best reconstruct the input image.

At operation 215, the system reconstructs the image based on the modulation parameters. In some cases, the operations of this step refer to, or may be performed by, a synthesizer network as described with reference to FIGS. 3 and 4. In some cases, the reconstructed image may have a higher resolution than the original image, or may include inpainted portions of the image that weren't included in the original signal.

Accordingly, in some embodiments, the system includes a synthesizer network (e.g., MLP with sine function activations) that is able to reconstruct high-frequency components of the target signal and elements from a wider frequency spectrum. The system provides increased control over the MLP's internal feature maps, leading to increased expressiveness of the latent space. In some examples, feature maps obtained at a second layer of the synthesizer network are conditioned on four different latent vectors compared to the concatenation approach. Therefore, using the modulator network provides more control over the internal feature maps, with variations in phase, amplitude, and frequency.

Network Architecture

An apparatus and method for signal processing are described. One or more embodiments of the apparatus and method include a modulator network comprising a plurality of modulator layers, wherein each of the plurality of modulator layers of the modulator network is configured to output a different set of modulation parameters based on a same digital signal and a synthesizer network comprising a plurality of synthesizer layers, wherein the synthesizer network represents a continuous function of a signal parameter of the digital signal, and wherein each of the synthesizer layers is configured to receive the set of modulation parameters from a corresponding modulator layer of the modulator network.

In some examples, the modulator layers comprise multi-layer perceptron (MLP) layers with rectified linear unit (ReLU) activation. In some examples, the synthesizer layers comprise MLP layers with sine function activation. Some examples of the apparatus and method described above further include an encoder configured to produce a latent vector representing the digital signal, wherein the modulator network takes the latent vector as input.

Figure 3:
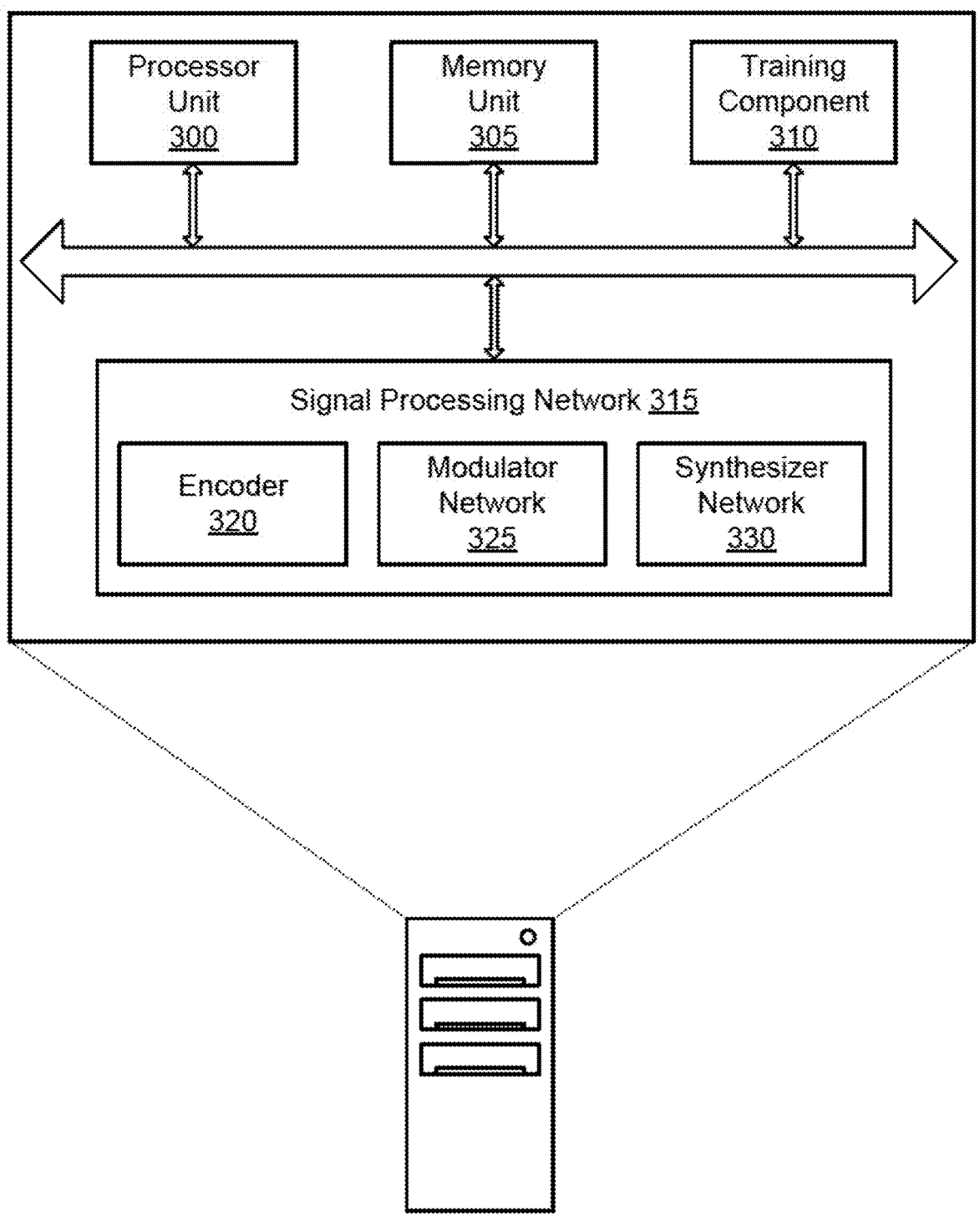
FIG. 3 shows an example of a signal processing apparatus according to aspects of the present disclosure.

FIG. 3 shows an example of a signal processing apparatus according to aspects of the present disclosure. The example shown includes processor unit 300, memory unit 305, training component 310, and signal processing network 315. The signal processing network 315 includes encoder 320, modulator network 325, and synthesizer network 330. The signal processing apparatus is an example of, or includes aspects of, the corresponding element described with reference to FIG. 1.

In one embodiment, the signal processing apparatus includes a modulator network 325 comprising a plurality of modulator layers, wherein each of the plurality of modulator layers of the modulator network 325 is configured to output a different set of modulation parameters based on a same digital signal and a synthesizer network 330 comprising a plurality of synthesizer layers, wherein the synthesizer network 330 represents a continuous function of a signal parameter of the digital signal, and wherein each of the synthesizer layers is configured to receive the set of modulation parameters from a corresponding modulator layer of the modulator network 325.

According to some embodiments of the present disclosure, the signal processing apparatus includes a computer implemented artificial neural network (ANN) that produces a predicted signal value of an input signal. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments, training component 310 receives a digital signal including original signal values corresponding to a discrete set of original sample locations. The training component 310 then computes a loss function based on the predicted signal value and a value of the original signal values corresponding to the at least one of the original sample locations. The training component 310 then trains the modulator network 325 and the synthesizer network 330 based on the loss function.

In some examples, the predicted signal values correspond to predicted color values of a training image at pixel locations corresponding to the original sample locations. In some examples, the training is based on an auto-encoder training process.

According to some embodiments, the signal processing network 315 receives a digital signal including original signal values corresponding to a discrete set of original sample locations. In some examples, the discrete set of original sample locations correspond to pixel location within the digital image, and the predicted signal value includes color values at the additional location. In some examples, signal processing network 315 inpaints at least one pixel of the digital image based on the predicted signal value, where the additional location includes a location of the inpainted at least one pixel. In some examples, signal processing network 315 generates a refined digital image based on the predicted signal value, where the refined digital image includes a higher resolution than the digital image.

In some examples, signal processing network 315 interpolates an intermediate frame of a digital video based on the predicted signal value to produce an updated digital video with a higher frame rate than the digital video, where the digital signal includes the digital video. In some examples, the digital signal includes a digital audio signal. In some examples, the digital signal includes a three dimensional (3D) image, and the original signal values represent distances from a surface of the 3D image. In some examples, the modulator network 325 and the synthesizer network 330 are trained based on training signals other than the digital signal. In some examples, the discrete set of original sample locations does not include the additional location.

According to some embodiments, the encoder 320 encodes at least a portion of a digital image to produce a latent vector, where the modulation parameters are generated based on the latent vector. The encoder 320 is configured to produce a latent vector representing the digital signal, wherein the modulator network 325 takes the latent vector as input.

In some embodiments, the encoder 320 encodes the digital signal to produce a latent vector, where the modulator network 325 takes the latent vector as input to produce the modulation parameters. The encoder 320 is an example of, or includes aspects of, the corresponding element described with reference to FIG. 4.

According to some embodiments, the modulator network 325 generates modulation parameters based on the digital signal, where each of a set of modulator layers of the modulator network 325 outputs a set of the modulation parameters. The modulator network 325 comprises a plurality of modulator layers, wherein each of the plurality of modulator layers of the modulator network 325 is configured to output a different set of modulation parameters based on a same digital signal.

In some examples, the modulator layers include multi-layer perceptron (MLP) layers with rectified linear unit (ReLU) activation. An MLP is a feed forward neural network that typically consists of multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters). Modulator network 325 is an example of, or includes aspects of, the corresponding element described with reference to FIG. 4.

In a neural network, an activation function may be used to transforming summed weighted inputs from a node into the activation of the node or an output. A ReLU layer may implement a rectified linear activation function, which comprises a piecewise linear function that outputs the input directly if is positive, otherwise, it outputs zero. A rectified linear activation function may be used as a default activation function for many types of neural networks. Using a rectified linear activation function may enable the use of stochastic gradient descent with backpropagation of errors to train deep neural networks. The rectified linear activation function may operate similar to a linear function, but it may enable complex relationships in the data to be learned. The rectified linear activation function may also provide more sensitivity to the activation sum input to avoid saturation. A node or unit that implements a rectified linear activation function may be referred to as a rectified linear activation unit, or ReLU for short. Networks that use a rectifier function for hidden layers may be referred to as rectified networks.

According to some embodiments, synthesizer network 330 generates a predicted signal value of the digital signal at an additional location, where each of a set of synthesizer layers of the synthesizer network 330 operates based on the set of the modulation parameters from a corresponding modulator layer of the modulator network 325. In some examples, synthesizer network 330 computes, at a first synthesizer layer, a product of a set of modulation parameters output by a modulator layer and a continuous function of a first set of features to produce a second set of features, where the second set of features are input to a second synthesizer layer. In some examples, the continuous function includes a sine function, and the product includes a Hadamard product.

According to some embodiments, synthesizer network 330 comprises a plurality of synthesizer layers, wherein the synthesizer network 330 represents a continuous function of a signal parameter of the digital signal, and wherein each of the synthesizer layers is configured to receive the set of modulation parameters from a corresponding modulator layer of the modulator network 325. In some examples, the synthesizer layers include MLP layers with sine function activation.

According to some embodiments, synthesizer network 330 generates a predicted signal value of the digital signal for at least one of the original sample locations, where each of a set of synthesizer layers of the synthesizer network 330 receives the set of the modulation parameters from a corresponding modulator layer of the modulator network 325. Synthesizer network 330 is an example of, or includes aspects of, the corresponding element described with reference to FIG. 4.

One or more embodiments of the present disclosure provide a signal processing network 315 that generates qualitatively and quantitatively superior functional representations. These functional representations generalize to multiple instances. In an embodiment, a local implicit neural representation leads to generalization and achieves higher fidelity where a set of local functions (defined on a tile of the input domain) are combined to reconstruct the target signal. Additionally, the signal processing network 315 includes a modulator network 325 and a synthesizer network 330 for high-fidelity functional neural representations of images, shapes and videos. However, the present disclosure is not limited to functional representations of images, shapes, and videos and signals mentioned herein. Furthermore, the signal processing network 315 applies a conditioning method using a non-linear activation function-based neural network (e.g., ReLU MLP). In some examples, the ReLU MLP modulates amplitude, phase, and/or frequency of periodic activations in the synthesizer network 330.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 4:
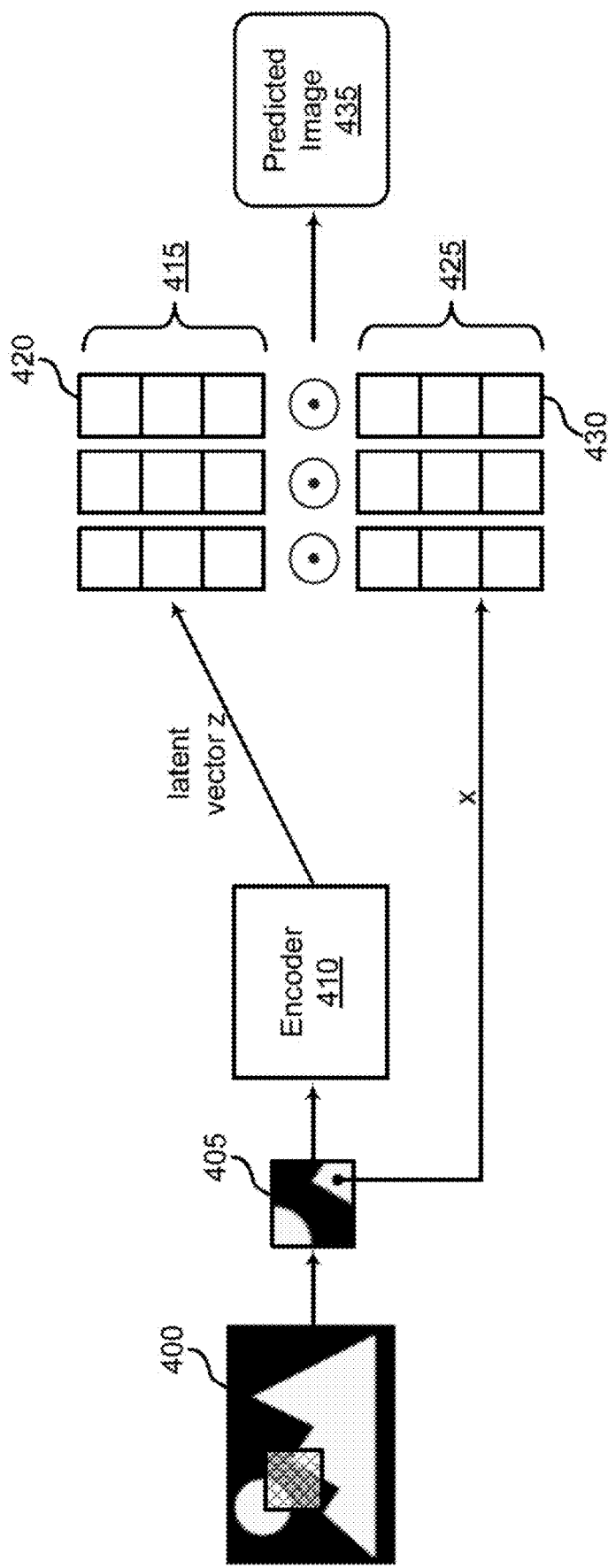
FIG. 4 shows an example of a signal processing network according to aspects of the present disclosure.

FIG. 4 shows an example of a signal processing network according to aspects of the present disclosure. The example shown includes image 400, tile 405, encoder 410, modulator network 415, synthesizer network 425, and predicted image 435. In some cases, the signal processing network is also referred to as a network model.

One or more embodiments of the present disclosure introduce local parameterization of neural implicit functions approximating signals defined on a Euclidean input domain $\mathbb{R}^n$. The network model can encode one or multiple signal instances. It is defined on a regular tiling of the domain, where each tile is endowed with a latent code $z \in \mathbb{R}^d$. At a tile level, a synthesizer network 425 with periodic activations maps normalized local input coordinates $x \in [0,1]^n$ to output values in $\mathbb{R}^m$.

In an embodiment, the synthesizer network 425 is modulated by a modulator network 415, conditioned on a latent variable z of a tile 405. The modulation mechanism increases performance of the signal processing network than simply concatenating the inputs x and z. The network model having applied the modulation mechanism is more efficient than hypernetworks.

The continuous functional representation for signals $\mathbb{R}^n \to \mathbb{R}^m$ is defined. In some examples, local implicit representations deal with 2D color images, where n=2 and m=3, but embodiments of the present disclosure are not limited to 2D color images, and methods and systems described herein can also be applied to or configured for other signals (e.g., videos and shapes). For illustrative purpose, an example image 400 is a natural landscape as shown in FIG. 4. A tile 405 is extracted from the image 400. The tile 405 is input to an encoder 410. The encoder 410 is an example of, or includes aspects of, the corresponding element described with reference to FIG. 3.

In some cases, images 400 are complex and highly varied at a global scale. However, images 400 are relatively simple locally, for example, simple edges and textures reoccur commonly across images 400 that are otherwise distinct at the global level. As a result, the input domain is split into regular fixed-size tiles 405. Rather than fitting a neural function to the entire signal, the network model independently reconstructs the local signal within each tile 405, regardless of which image a tile belongs to. The implicit representation is defined as a conditional mapping of the tile's normalized coordinates (n-dimensional unit cube).

In some embodiments, local implicit representation depends on a network architecture having a synthesizer network 425 and a modulator network 415. The synthesizer network is an MLP with periodic activations. The synthesizer network 425 acts on local coordinates $x \in \mathbb{R}^n$ of a tile 405 to synthesize a target signal (e.g., generate a predicted image 435). Additionally, the modulator network 415 is a regular MLP with ReLU activations (i.e., non-linear activation function-based network). The modulator network 415 maps a latent vector z, describing the tile's content, to control parameters that modulate intermediate layers of the synthesizer network 425.

In one embodiment, synthesizer network 425 includes synthesizer layers 430. Synthesizer network 425 is an example of, or includes aspects of, the corresponding element described with reference to FIG. 3. In some embodiments, the synthesizer network 425 operates at the tile level and includes K hidden layers having hidden features $h_1, \ldots, h_K$. Each layer uses a periodic nonlinear activation function and is formulated recursively. Detail regarding the synthesizer network 425 is described with reference to FIGS. 5 and 6.

The activations of synthesizer network 425 are modulated using a second MLP with ReLU activations that acts on the per-tile latent code z. The second MLP with ReLU activations is another non-linear activation function-based network. It is formulated recursively and by adjusting modulation variables $\alpha_i$, the modulator network 415 can adjust the frequencies, phase, and/or amplitudes of the sinusoid (e.g., sine) in the synthesizer network 425 to match a target signal.

In one embodiment, modulator network 415 includes modulator layers 420. Modulator network 415 is an example of, or includes aspects of, the corresponding element described with reference to FIG. 3.

Inference

A method, apparatus, and non-transitory computer readable medium for signal processing are described. One or more embodiments of the method, apparatus, and non-transitory computer readable medium include receiving a digital signal comprising original signal values corresponding to a discrete set of original sample locations, generating modulation parameters based on the digital signal using a modulator network, wherein each of a plurality of modulator layers of the modulator network outputs a set of the modulation parameters, and generating a predicted signal value of the digital signal at an additional location using a synthesizer network, wherein each of a plurality of synthesizer layers of the synthesizer network operates based on the set of the modulation parameters from a corresponding modulator layer of the modulator network.

Some examples of the method, apparatus, and non-transitory computer readable medium described above further include encoding at least a portion of a digital image to produce a latent vector, wherein the modulation parameters are generated based on the latent vector. In some examples, the discrete set original sample locations correspond to pixel location within the digital image, and the predicted signal value comprises color values at the additional location.

Some examples of the method, apparatus, and non-transitory computer readable medium described above further include inpainting at least one pixel of the digital image based on the predicted signal value, wherein the additional location comprises a location of the inpainted at least one pixel. Some examples of the method, apparatus, and non-transitory computer readable medium described above further include generating a refined digital image based on the predicted signal value, wherein the refined digital image comprises a higher resolution than the digital image.

Some examples of the method, apparatus, and non-transitory computer readable medium described above further include interpolating an intermediate frame of a digital video based on the predicted signal value to produce an updated digital video with a higher frame rate than the digital video, wherein the digital signal comprises the digital video. In some examples, the digital signal comprises a digital audio signal. In some examples, the digital signal comprises a three dimensional (3D) image, and the original signal values represent distances from a surface of the 3D image.

Some examples of the method, apparatus, and non-transitory computer readable medium described above further include computing, at a first synthesizer layer, a product of a set of modulation parameters output by a modulator layer and a continuous function of a first set of features to produce a second set of features, wherein the second set of features are input to a second synthesizer layer. In some examples, the continuous function comprises a sine function, and the product comprises a Hadamard product. In some examples, the modulator network and the synthesizer network are trained based on training signals other than the digital signal. In some examples, the discrete set of original sample locations does not include the additional location.

Figure 5:
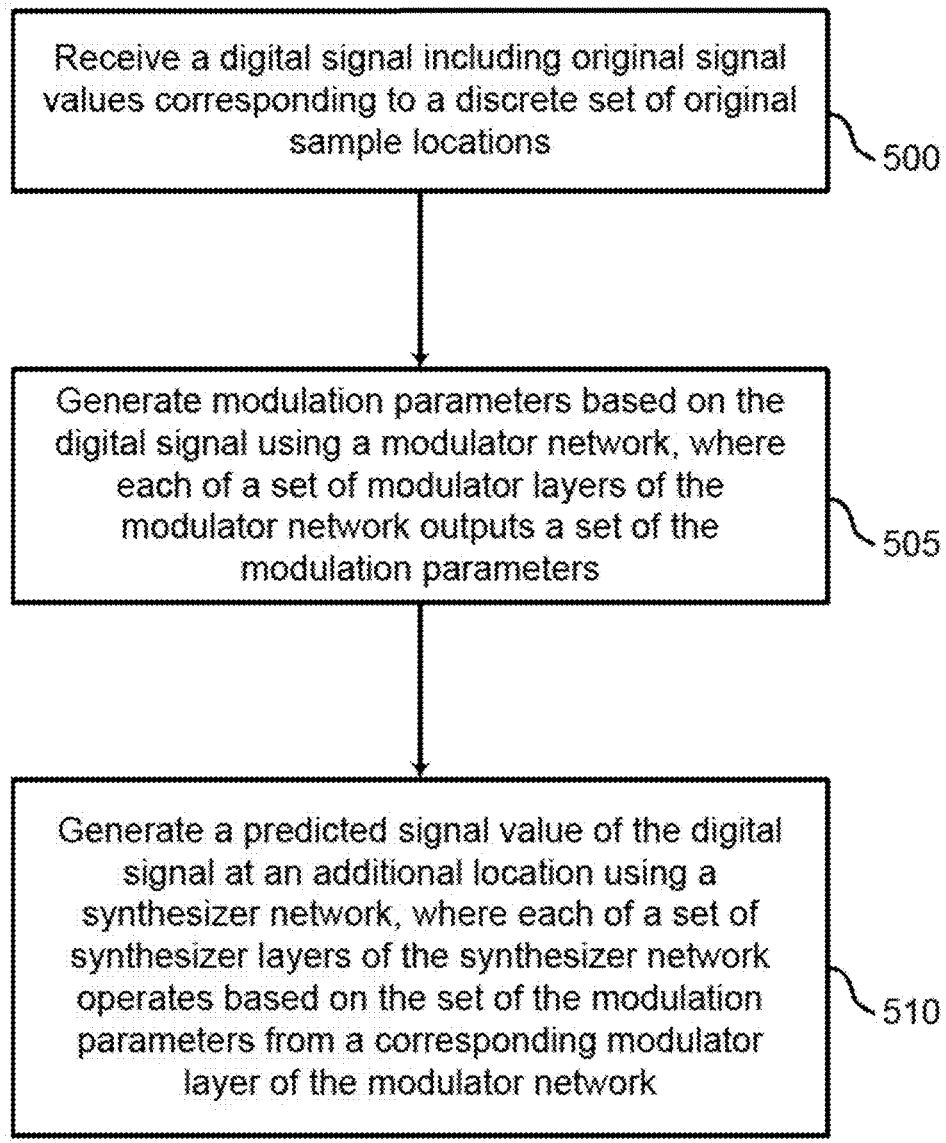
FIG. 5 shows an example of signal processing according to aspects of the present disclosure.

FIG. 5 shows an example of signal processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives a digital signal including original signal values corresponding to a discrete set of original sample locations. In some cases, the operations of this step refer to, or may be performed by, a signal processing network as described with reference to FIG. 3.

In some embodiments, the system includes a neural network to receive at least a visual signal and encode visual signals (e.g., images, video, shapes, and 3D scenes) which are implicit representations for signals that are encoded in weights of the neural network. The encoding networks may be queried at arbitrary locations in input domains and are useful for interpolation across different domains (e.g., 3D view, time and appearance). Functional neural networks (e.g., MLPs) are used to encode these signals and such encodings provide a differentiable synthesis path which is used end-to-end for texture mapping and volumetric rendering.

In some examples, the system is configured to learn local priors. Sine activations are periodic and have unbounded support over the input domain. Therefore, sine activations are used to compactly represent complex signals but do not perform well in generalization. On the other hand, non-linear activation function-based networks (e.g., ReLU) are relatively simple, generalize more easily. But ReLU networks depend on more parameters to fit complex signals accurately. The reason behind is that the sine activation is periodic and does not turn off (i.e., go to zero) at specific locations in the domain. The support of sine activations depends on splitting input domains into a regular grid. The bounded support is important to generalization. Furthermore, training models on smaller signals reduces complexity.

In some embodiments, local formulation and modulation mechanism enable generalization to more than one instance. In an embodiment, the continuous functional representation for signals $\mathbb{R}^n \to \mathbb{R}^m$ is defined. In some examples, local implicit representations involve 2D color images, where n=2 and m=3, but embodiments of the present disclosure are not limited to 2D color images. The signal processing network herein can process other types of signals (e.g., videos and shapes).

In some cases, an implicit functional neural representation may represent more than one image simultaneously. Images are relatively simple locally, for example, simple edges and textures reoccur commonly across images that are otherwise distinct at the global level. As a result, the input domain is split into regular fixed-size tiles. In an embodiment, the network model independently reconstructs the local signal within each tile, regardless of which image a tile belongs to. The implicit representation is defined as a conditional mapping of the tile's normalized coordinates (n-dimensional unit cube):

$$f_\theta : [0,1]^n \times \mathbb{R}^d \to \mathbb{R}^m \quad (1)$$

where $\theta$ is the collection of trainable network parameters, and the second input is a latent conditioning vector $z \in \mathbb{R}^d$ that compactly summarizes the content of a tile.

The system is also configured to deal with continuity at tile boundaries. After training, joining the tiles from a single image together yields a piece-wise continuous representation of the image. In some cases, there is no visible discontinuity at tile boundaries by overlapping the tiles by half a tile. When evaluating the continuous representations, the contribution of overlapping tiles is weighted n-linearly according to the distance between the point and the tile centers.

At operation 505, the system generates modulation parameters based on the digital signal using a modulator network, where each of a set of modulator layers of the modulator network outputs a set of the modulation parameters. In some cases, the operations of this step refer to, or may be performed by, a modulator network as described with reference to FIGS. 3 and 4.

In some examples, a single model is used for multiple instances of a type of signal to save memory and learn useful priors which impacts the quality of fit. For implicit representations, all the instances share a common input domain x and networks are conditioned using a latent variable z to learn $f_\theta(x; z) = y$, where $\theta$ represents network parameters. In one embodiment, the system uses a conditioning variable to modulate an implicit function.

In an embodiment, the local implicit representation applies a signal processing system including a modulator network and a synthesizer network. The synthesizer network is an MLP with periodic activations (e.g., sine). The synthesizer network acts on local coordinates $x \in \mathbb{R}^n$ of a tile to synthesize a target signal (e.g., an image). Additionally, the modulator network is a regular MLP with ReLU activations (i.e., non-linear activation function-based network). The modulator network maps a latent vector z (i.e., describing the tile's content) to a set of control parameters that modulate intermediate layers of the synthesizer network. In some cases, the control parameters are also referred to as modulation parameters.

In some embodiments, the synthesis network operates at the tile level and includes K hidden layers having hidden features $h_1, \ldots, h_K$. Each layer uses a periodic nonlinear activation function and is defined recursively as:

$$h_i = \alpha_i \odot \sin(w_i h_{i-1} + b_i) \quad (2)$$

where $w_i \in \mathbb{R}^{d_i \times d_{i-1}}$ and $b_i \in \mathbb{R}^{d_i}$ are the learnable weights and biases for layer i, respectively, and $\alpha_i \in \mathbb{R}^{d_i}$ a modulation variable. The local coordinates of the tile are represented as $h_0 = x \in \mathbb{R}^n$. The sine function is applied pointwise and $\odot$ denotes element-wise multiplication. Sine activations are useful and perform better in modeling high-frequency signals compared to synthesizer networks using ReLU activations.

The activations of synthesizer network are modulated using a second MLP with ReLU activations that acts on the per-tile latent code z. The second MLP with ReLU activations is another non-linear activation function-based network. It is formulated recursively as follows:

$$h_0' = \text{ReLU}(w_0' z + b_0') \quad (3)$$

$$h_{i+1}' = \text{ReLU}(w_{i+1}' h_i' + b_{i+1}') \quad (4)$$

where $\text{ReLU}(\bullet) = \max(0, \bullet)$ and $w_i'$, $b_i'$ are weights and biases of a network (e.g., MLP). The i-th modulation weights $\alpha_i$ of the synthesizer network are obtained as a transformation (e.g., affine transformation) of the corresponding hidden feature from the modulator network, with weights $w_i''$ and biases $b_i''$:

$$\alpha_i = w_i'' h_i' + b_i'' \quad (5)$$

By adjusting the modulation variables $\alpha_i$, the modulator network can adjust the frequencies, phase, and/or amplitudes of the sinusoid in the synthesizer network to match a target signal.

At operation 510, the system generates a predicted signal value of the digital signal at an additional location using a synthesizer network, where each of a set of synthesizer layers of the synthesizer network operates based on the set of the modulation parameters from a corresponding modulator layer of the modulator network. In some cases, the operations of this step refer to, or may be performed by, a synthesizer network as described with reference to FIGS. 3 and 4.

MLPs using ReLU activations fail to reconstruct high-frequency components of the target signal. However, in some embodiments, Sine-MLPs (i.e., the synthesizer layers comprise MLP layers with sine function activation) are able to reconstruct elements from a wider frequency spectrum. An example experiment including a 6×6 grid of Perlin texture patches shows that the horizontal and vertical frequencies are increased for Sine-MLPs.

Figure 6:
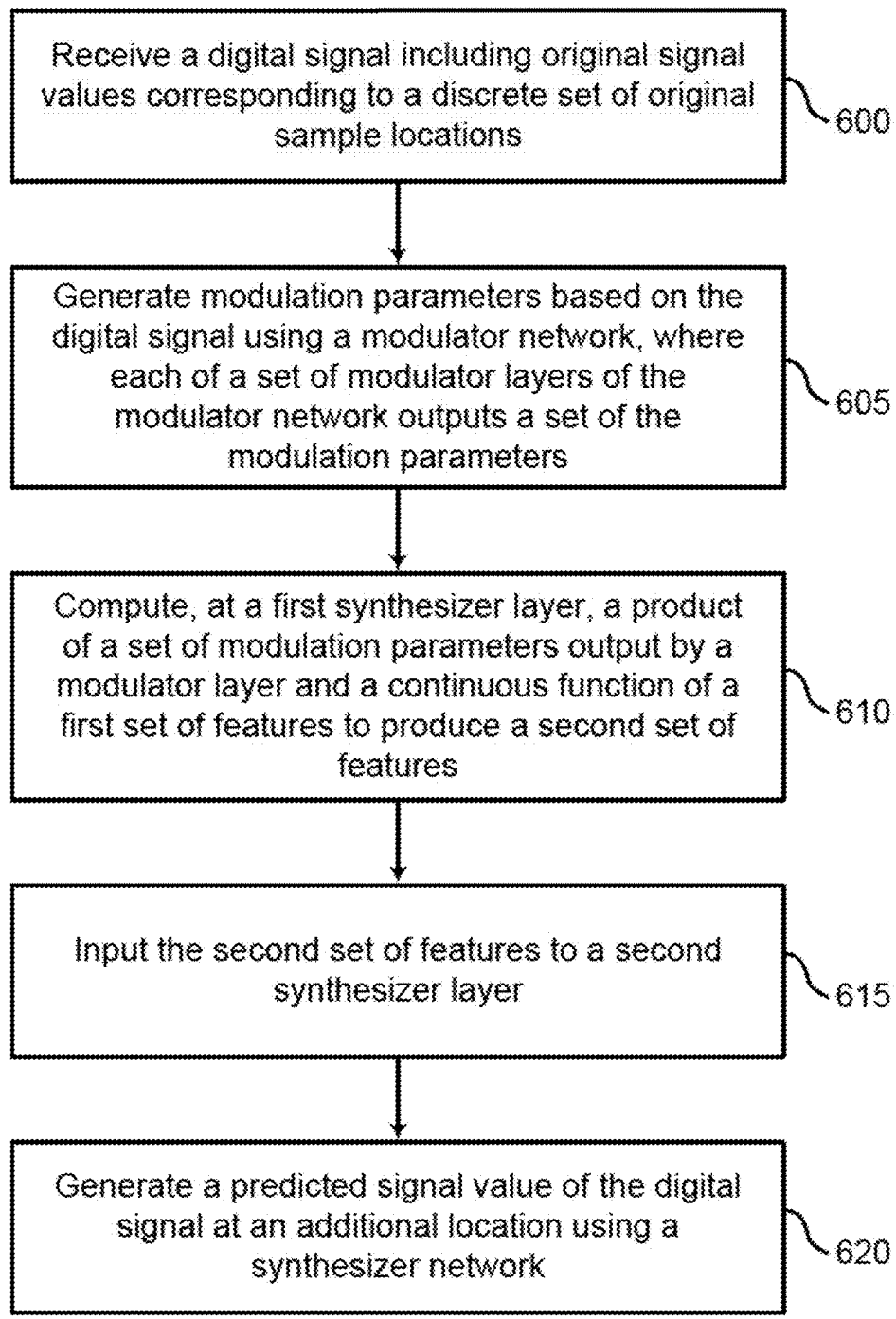
FIG. 6 shows an example of signal processing based on intermediate features of a synthesizer network according to aspects of the present disclosure.

FIG. 6 shows an example of signal processing based on intermediate features of a synthesizer network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system receives a digital signal including original signal values corresponding to a discrete set of original sample locations. In some cases, the operations of this step refer to, or may be performed by, a signal processing network as described with reference to FIG. 3.

Existing models depend on retraining the entire model for each new signal (i.e., including θ), which is more costly. In an embodiment, the system is configured to split a signal to approximate into smaller, easier to fit components based on locality. The system then learns a latent space prior from a family of signals, which can be leveraged to fit previously unseen signals efficiently. At test time, the model parameters are fixed, and the signal processing network optimizes a new latent vector for each new tile.

At operation 605, the system generates modulation parameters based on the digital signal using a modulator network, where each of a set of modulator layers of the modulator network outputs a set of the modulation parameters. In some cases, the operations of this step refer to, or may be performed by, a modulator network as described with reference to FIGS. 3 and 4.

At operation 610, the system computes, at a first synthesizer layer, a product of a set of modulation parameters output by a modulator layer and a continuous function of a first set of features to produce a second set of features. In some cases, the operations of this step refer to, or may be performed by, a synthesizer network as described with reference to FIGS. 3 and 4.

Conventional models use concatenation approach or hypernetworks. In some examples, concatenating the latent code z and input coordinates x performs poorly with periodic activations, because the latent code cannot alter the frequencies and amplitude of the intermediate sine activations. Hypernetworks may perform better, but they are extremely costly for even moderately complex synthesis MLPs. This is because their last layer needs to output all the parameters ($w_i$; $b_i$) of the synthesizer network. In the present disclosure, the network model modulates the sinusoidal activation of the synthesizer network using the activations of a ReLU-based modulator. This enables high-quality synthesis and generalization, with a parsimonious memory and runtime footprint.

At operation 615, the system inputs the second set of features to a second synthesizer layer. In an embodiment, the system is configured to condition on the latent variable z. The architecture includes two subnetworks, a network that takes coordinates from the input domain $[0, 1]^n$ as inputs, and a modulator network implemented as a ReLU MLP. The modulator network takes the latent code z as input. The synthesizer network is modulated by the modulator network as follows:

$$h_i: x \in \mathbb{R}^{d_i} \longmapsto g_i(z) \cdot \sin(w_i x + b_i) \in \mathbb{R}^{d_{i+1}} \qquad (6)$$

where $g_i$ refers to the modulator network i-th feature map. The (·) denotes element-wise multiplication.

One approach to condition a baseline model (e.g., SIREN) on z is to simply concatenate z with the model's input. However, such a baseline model fails to converge. This is because the latent z code can only add a phase-shift, $w_1'z$, to the first sinusoid, which has no effect on the frequency and amplitude of the sinusoids in the subsequent layers, and therefore is less expressive. The output of this baseline's second layer is formulated as:

$$\sin(w_2 \sin(w_1 x + w_1' z + b_1) + b_2) \qquad (7)$$

One or more embodiments of the present disclosure provide that the latent z code can modulate the amplitude and frequency of the generated content. The network model's second layer output is formulated as:

$$g_2(z) \cdot \sin(w_2 g_1(z) \cdot \sin(w_1 x + b_1) + b_2) \qquad (8)$$

where $g_1(z)$ acts as a frequency modulator, and $g_2(z)$ as an amplitude modulator.

Conditioning a sine-synthesizer by concatenation does not yield much control over the MLP's internal feature maps, which limits the expressiveness of the latent space. In some embodiments of the present disclosure, feature maps obtained at the second layer of a synthesizer network conditioned on four different latent vectors $z_i$. Concatenating $z_i$ with the input only changes the phase of the signals at the second layer. This limits the reusability of the model across diverse signals. Using the modulator network provides more control over the internal feature maps, with variations in phase, amplitude, and/or frequency.

At operation 620, the system generates a predicted signal value of the digital signal at an additional location using a synthesizer network. In some cases, the operations of this step refer to, or may be performed by, a synthesizer network as described with reference to FIGS. 3 and 4.

Training and Evaluation

A method, apparatus, and non-transitory computer readable medium for training a neural network are described. One or more embodiments of the method, apparatus, and non-transitory computer readable medium include receiving a digital signal comprising original signal values corresponding to a discrete set of original sample locations, generating modulation parameters based on the digital signal using a modulator network, wherein each of a plurality of modulator layers of the modulator network outputs a set of the modulation parameters, generating a predicted signal value of the digital signal for at least one of the original sample locations using a synthesizer network, wherein each of a plurality of synthesizer layers of the synthesizer network receives the set of the modulation parameters from a corresponding modulator layer of the modulator network, computing a loss function based on the predicted signal value and a value of the original signal values corresponding to the at least one of the original sample locations, and training the modulator network and the synthesizer network based on the loss function.

Some examples of the method, apparatus, and non-transitory computer readable medium described above further include encoding the digital signal to produce a latent vector, wherein the modulator network takes the latent vector as input to produce the modulation parameters. In some examples, the predicted signal values correspond to predicted color values of a training image at pixel locations corresponding to the original sample locations. In some examples, the training is based on an auto-encoder training process.

Figure 7:
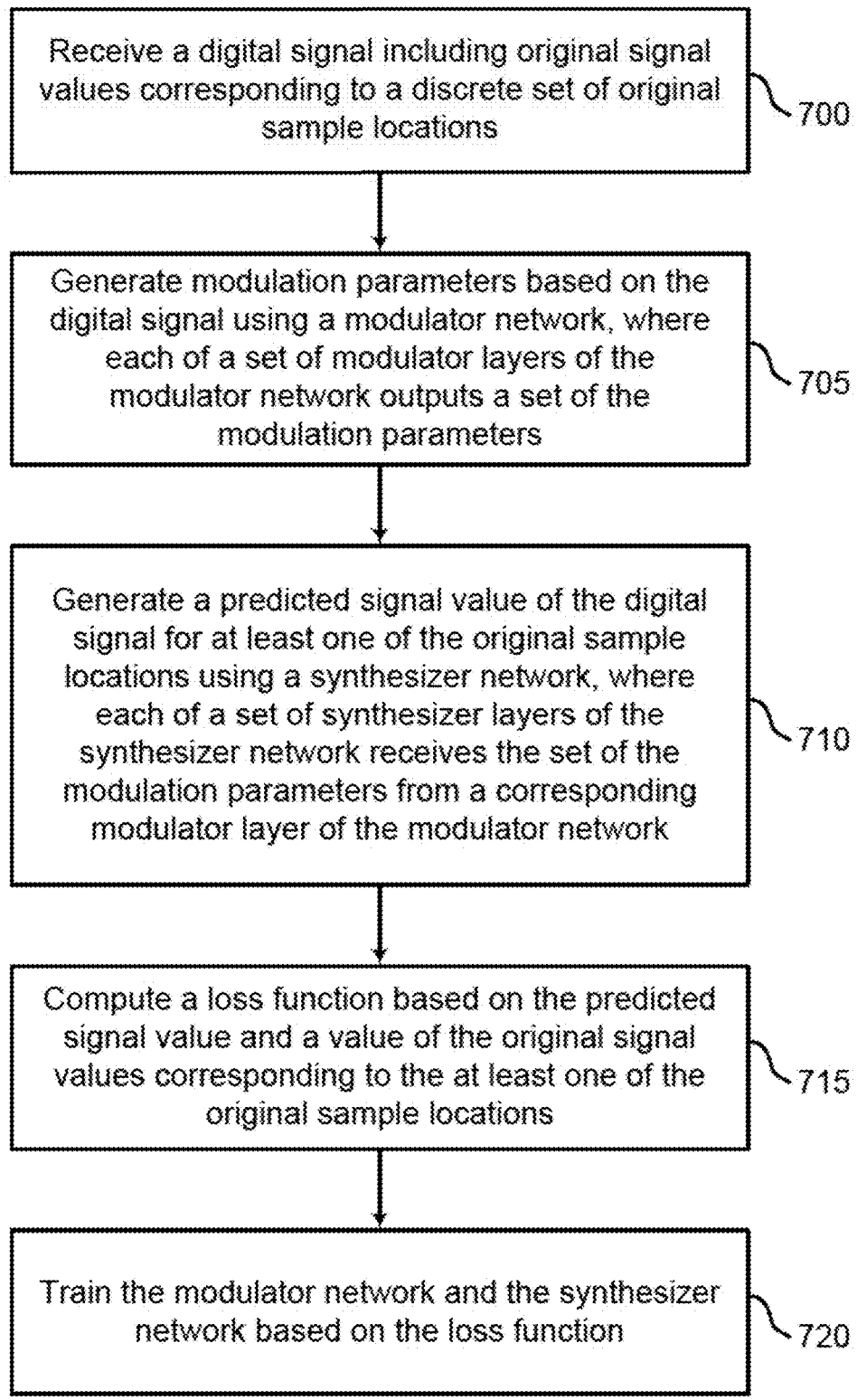
FIG. 7 shows an example of a process for training a signal processing network according to aspects of the present disclosure.

FIG. 7 shows an example of a process for training a signal processing network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Accordingly, the parameters and weights of a signal processing apparatus are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. in other words, the learning algorithm generalizes from the training data to unseen examples.

At operation 700, the system receives a digital signal including original signal values corresponding to a discrete set of original sample locations. In some cases, the operations of this step refer to, or may be performed by, a training component as described with reference to FIG. 3.

One or more embodiments of the present disclosure provide multi-layer perceptrons (MLPs) that makes functional representations for sampling and reconstruction tasks involving low-dimensional signals (e.g., images, shapes or light fields). The signal processing network can represent high-frequency content using periodic activations or positional encodings at the expense of generalization. In one embodiment, the signal processing network provides a functional representation that generalizes to multiple instances and achieves competitive fidelity. Complex signals vary widely when viewed at a global scale, but they share much of the same appearance locally (e.g., edges, textures for images). Accordingly, it is easier for a local model to generalize. In some cases, the network model decomposes a signal domain into a grid where each tile of the grid is represented by a latent variable.

At operation 705, the system generates modulation parameters based on the digital signal using a modulator network, where each of a set of modulator layers of the modulator network outputs a set of the modulation parameters. In some cases, the operations of this step refer to, or may be performed by, a modulator network as described with reference to FIGS. 3 and 4.

In some embodiments, a ReLU based MLP modulator network (i.e., a non-linear activation function-based neural network conditioned on per-tile latent code) predicts coefficients or parameters that modulate the activations of a MLP synthesizer network. The synthesizer network includes sine activations. The signal processing network is configured as an auto-encoder (i.e., using another network to predict latent codes) or configured as an auto-decoder (i.e., the latent codes are optimized jointly with network weights). The signal processing network outperforms existing techniques, yields high-quality functional representations of signals (e.g., images, videos, shapes), and can represent multiple instances by conditioning on the latent codes (i.e., latent vectors).

At operation 710, the system generates a predicted signal value of the digital signal for at least one of the original sample locations using a synthesizer network, where each of a set of synthesizer layers of the synthesizer network receives the set of the modulation parameters from a corresponding modulator layer of the modulator network. In some cases, the operations of this step refer to, or may be performed by, a synthesizer network as described with reference to FIGS. 3 and 4.

In some embodiments, functional neural representations (e.g., multi-layer perceptrons, MLPs) are used. MLPs are compact, efficient, simple-to-adapt, and able to approximate complex signals. For example, complex signals may include images, videos, audio recordings, light-fields, or implicitly defined three-dimensional (3D) shapes. In some cases, the accuracy of neural representations is increased to model complex signals with high-frequency details, and ignore generalizability. Some conventional approaches depend on training a neural network for each object. When they generalize to multiple instances, generalization decreases their faithfulness to the ground truth.

One or more embodiments of the present disclosure provide a neural functional representation that simultaneously achieves high-reconstruction quality and generalizes to multiple instances applying locality. In some examples, the domain of a target signal is decomposed into a regular grid where each tile is assigned a latent variable. The latent codes are used as conditioning variables in a functional mapping including two MLPs (i.e., a modulator network and a synthesizer network). The synthesizer network encodes target signals as mapping from local Cartesian coordinates of the input tile to the output domain. The synthesis network uses periodic activations (e.g., sine).

The modulator network uses non-linear activation functions (e.g., rectified linear unit or ReLU activations). The modulator network takes the per-tile latent code as inputs and then outputs variables or modulation parameters that modulate the amplitude, phase, and/or frequency of periodic activations of the synthesizer network. In some embodiments, the signal processing network is configured as an auto-encoder where the latent codes are obtained using a third encoder network. Alternatively, the signal processing network is configured as an auto-decoder, where the latent codes are optimized together with the weights and parameters of the network model.

At operation 715, the system computes a loss function based on the predicted signal value and a value of the original signal values corresponding to the at least one of the original sample locations. In some cases, the operations of this step refer to, or may be performed by, a training component as described with reference to FIG. 3.

In some examples, a supervised training model may be used that includes a loss function that compares predictions of the network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

During training, in an auto-decoder configuration, the system jointly optimizes the network model parameters θ, and the latent codes $z_i$ for N tiles in a training set $\mathcal{D}$. A fixed set of sample coordinates x and the corresponding ground truth signal value y is used for supervision in the tiles (i.e., pixel locations and pixel color in the case of images). The objective function is minimized by gradient descent as follows:

$$\theta^*, \{z_i^*\} = \operatorname*{argmin}_{\theta, z_1, \ldots, z_N} \mathbb{E}_{(x,y,i) \sim \mathcal{D}} \mathcal{L}(f_\theta(x, z_i), y) \quad (9)$$

where $\mathcal{L}$ is a loss function, $\mathcal{D}$ is the training set, and i indexes the tiles. After training, Functional representations for unseen test signals are obtained by fixing the network parameters θ, sampling a new set of latent variables z for new tiles. A same loss function above is used for optimization. In some examples, latent codes $z \sim \mathcal{N}(0, \sigma^2)$ are initialized as Gaussian random vectors with $\sigma = 10^{-3}$.

Alternatively, in some embodiments, the signal processing network is used in an auto-encoder configuration for multi-instance generalization. The latent codes are predicted by an encoder network that operates on tiles from the signal to auto-encoding (i.e., not free-variables for optimization) in the configuration. Auto-encoding enables the signal processing network to build a continuous representation of discrete input signals. This is useful in spatial super-resolution tasks (e.g., images, videos), frame interpolation (e.g., videos), reconstruction from sparse samples (e.g., light-fields, compression).

At operation 720, the system trains the modulator network and the synthesizer network based on the loss function. In some cases, the operations of this step refer to, or may be performed by, a training component as described with reference to FIG. 3.

Existing methods focus on increasing the accuracy of single-instance functional representation. For example, a full model $f_\theta$ is trained per target signal. Unlike existing technology, one or more embodiments of the present disclosure can generalize and represent many signals simultaneously. The target signals are decomposed into independent tiles, and the training dataset is a union of all tiles from all training signals. Each of N training tiles is represented by a latent code $z_i$, with $i \in \{1, \ldots, N\}$. The system generalizes well when used as an auto-decoder, or an auto-encoder.

Performance of apparatus, systems and methods of the present disclosure have been evaluated, and results indicate the embodiments of the present disclosure provide an improvement over existing technology. In some example experiments, a synthesizer-modulator network model of the present disclosure is compared to models based on conventional conditioning methods. Conditioning by concatenation approach involves concatenating the tile's latent code z with a spatial coordinate input x of a synthesizer network without a modulator network. The approach does not work well with a synthesizer network using periodic activations.

The concatenation-based baseline model uses a synthesizer network with sine activations. The baseline model does not include a modulator. For example, the baseline yields inferior results compared to the network model when a small image of 256×256 resolution is encoded in a network. In the generalization setting when multiple images are encoded using a single network, the baseline model fails to converge to a meaningful optimum because the latent code can only add a fixed phase shift, $w_{i,z} z$ to the first layer of the synthesizer network:

$$h_1 = \alpha_1 \odot \sin\left([w_{1,x}, w_{1,z}] \begin{bmatrix} x \\ z \end{bmatrix} + b_1\right) \quad (10)$$

The z-dependent bias has no explicit control on the frequency and amplitude of the sinusoids in subsequent layers and therefore is less expressive than a synthesizer plus modulator network of the present disclosure.

On the contrary, in some embodiments, network models of the present disclosure are configured such that the latent code z modulates $\alpha_t$ at layers (using a modulator network), and the modulator network can alter amplitude and/or frequency of the functional representation.

Recently, hypernetworks are another baseline model used to enable generalization for functional representations. A hypernetwork $\mathcal{H}$ is used instead of a modulator network and the hypernetwork takes the latent code z as input, and predicts all the parameters of the synthesizer network, i.e., the $w_i$, $b_i$ ($\alpha_i$ may be folded into the weights of the next layer). The hypernetwork $\mathcal{H}$ output all parameters of the synthesizer network with an overparameterized last layer. As a result, it is difficult to train hypernetworks and they are less efficient compared to signal processing network models of the present disclosure.

The performance of network models of the present disclosure is evaluated on three classes of signals (i.e., images, videos and 3D shapes). Two sets of evaluations (i.e., single-instance and generalization experiments) were conducted and results are recorded. In the first evaluation, the network model and baselines are trained on a single signal and evaluated for accuracy on the same signal. In the second evaluation, the network model and baselines are trained on a large dataset and evaluated on an independent test set.

The model is evaluated as a functional representation for individual signals to compare with existing methods that do not generalize. For example, baseline models include neural representations such as sinusoidal representation networks (SIREN), Fourier feature networks (FFNs), and a rectified linear unit based multi-layer perceptron (a ReLU MLP). In an embodiment, the network model is configured an auto-encoder in case of images and videos, and configured as an auto-decoder in case of shapes. A target signal is decomposed into local tiles. An encoder and latent codes are optimized together with the above modulator and synthesizer parameters. The baseline models are optimized to fit a target signal globally.

For single-image representations evaluation, the present disclosure demonstrates representation power of continuous functional representations by optimizing the model on single RGB image I with 2048×2048 resolution. In some examples, the image is split into 32×32 tiles with a latent vector $z_i$ assigned to each tile. Neighboring tiles overlap by half a tile in an axis to avoid discontinuities at the tile boundaries. The model parameters and latent variables are trained by minimizing a loss function (e.g., $L_2$) over color values.

In some examples, a four-layer neural network (e.g., MLP) is used for modulation and the synthesizer network includes 256 activations per layer. The latent space dimension is of 256. Baselines are implemented without a modulator. The network model outperforms the baseline models and produces cleaner outputs. Implicit neural representations with periodic functions (e.g., SIREN) perform well for low resolution images (i.e., but has decreased performance on high resolution images). The network model is able to generalize to high resolutions because it is local and more latent codes can be allocated for additional tiles. Fourier feature mapping to learn high frequency functions in low-dimensional domains (e.g., FFN) uses manual tuning for correctly setting the variance in a random Fourier kernel. Baselines are retrained for every instance and do not generalize to multiple images and increased accuracy in encoding low-resolution images.

The network model has increased performance processing videos due to high complexity of signals compared to baseline models. Target videos are of 640×272 resolution and have 250 frames. In some examples, the local model partitions the space-time domain into a grid of 32×32×5 tiles, each with its latent vector z. A loss function (i.e., $L_2$) is minimized over frame reconstruction with a regularizer on latent codes. In some examples, modulation and synthesizer networks include 512 activations with 4 layers. Reconstruction of high-frequency content in complex and varied video signals is difficult for implicit neural representations with periodic functions (e.g., SIREN baseline) in both spatial and time dimensions. Its errors are salient across jump-cuts between two shots in a video. Local models with a ReLU synthesizer network (without a modulator) outperform SIREN baseline. It is shown the importance of partitioned inputs. The reconstruction quality is evaluated in terms of peak signal-to-noise ratio (PSNR).

MLPs provide a smooth, differentiable, and resolution independent representation for 3D shapes. In some cases, signed distance fields are used as intermediate implicit shape representations. A unit cube bounding the shape is partitioned into 16×16×16 tiles (voxels). Each tile is assigned a latent vector z with 128 dimensions, sampled from a normal distribution $N(0, 0.01^2)$. Empty tiles may be discarded, and network capacity is dedicated to occupied tiles. 3D point samples x are drawn and a signed distance $\delta(x)$ to the shape is computed for each occupied tile. The samples are distributed by sampling mesh triangles and perturbing the samples in the normal direction so that half of the samples are close to the surface. The remaining half are sampled uniformly in free space. In some examples, 500 k samples are used to train the network model.

Performance in generalization of a continuous neural representation is evaluated and results are recorded. A convolution encoder is used to estimate latent vectors z for each tile in an image and video experiments. The network model of the present disclosure are used in an auto-decoder setup for shapes. The network model is compared to a local model using a ReLU MLP or Concat-ReLU.

In some examples, an image generalization model is trained using 64,000 tiles sampled randomly from 1024 images obtained from a large-scale face attributes dataset (e.g., the CelebA dataset). Each image is 128×128 in resolution and individual tiles are 32×32. A training loss function (e.g., $L_2$) is used as in the single instance case. The models are tested on 832 test tiles.

It is shown the importance of having both a local representation and conditional modulation architecture. Methods and the network model of the present disclosure reduce runtime and memory consumption compared to existing methods (e.g., SIREN is conditioned using a hypernetwork).

For video generalization experiments, in some examples, the network model is trained on 1024 videos from Vimeo-90 k septuplet dataset. Each video is 7-frame long and has 448×256 resolution. These videos are subdivided into 16×16×7 spatio-temporal tiles, each of which is represented by a latent code. The MLPs have 6 layers and 512 activations in the hidden layers for the evaluation. The number of parameters in the synthesizer network is 1 million. Accordingly, the hypernetworks are impractical as a conditioning mechanism for the synthesizer network due to memory constraints.

For shape generalization, in some examples, 98 large meshes are sampled for training and 13 for testing from a 3D printing models dataset (e.g., Thingi10 k dataset). Configurations for the MLP and space partitioning are same as in the single-instance experiment. For test meshes, the latent codes are optimized with model parameters frozen. An improvement is observed over Concat-ReLU because local shapes are relatively simple to estimate using signed distance functions (SDFs) which may be approximated well using ReLU.

The experiments also demonstrate that implicit nature of methods and models herein can be used for task dependent interpolation. In some example experiments, 90 cropped and aligned images of 300×300 resolution captured in a one-light-at-a-time (OLAT) setup are used to perform image-based relighting. Each image is captured with the scene illuminated using LED lights resembling a point-light source. Additionally, camera pose remains constant across all the images.

In some embodiments, training data includes pairs of $\{(x_j, y_i), y_{ij}\}$, where $x_j$ are image coordinates, $y_i$ s the lighting direction corresponding to image i and $y_{ij}$ is the radiance at $x_j$ in image i. The set of image coordinates $x_j$ remain constant across all the images. The network model learns a function mapping: $\mathcal{M}_{74}: \mathbb{R}^2 \times \mathbb{R}^3 \mapsto \mathbb{R}^3$, from image coordinates and light positions to pixel intensities. The synthesizer network takes $x_j$ as input and $y_i$ passes through the modulator network. The parameters of the network model θ are learned by minimizing a loss (e.g., $L_2$) over the image intensities.

At test time, new light-directions $\gamma_i'$ may be used to render images using the learned function $\mathcal{M}_\theta(x_j; y_i')$. Implicit neural representations (e.g., SIREN) and non-linear activation function-based networks (e.g., ReLU-MLP with positional encoding (PE) which uses basic conditioning-by-concatenation) are implemented for comparison, where $[x_j, y_i]$ is the input. In an example, a scene relit using light-directions is not present in the training set. Methods and the network model of the present disclosure reconstruct light-dependent effects (e.g., shadows and specular highlights) with increased fidelity. PSNR on training and validation sets are also evaluated and recorded.

In some cases, tile size has impact on the performance of functional representations of the network model. Signals may be partitioned to an extent where there is a single sample per tile. In this way, signal reconstruction becomes simple because a constant value is then regressed per tile. In some cases, interpolation properties possessed by implicit functions are lost. A single tile-for-each-signal approach keeps the interpolation properties intact, but signal reconstruction may become challenging. Experiments and evaluation were conducted on such trade-off seeking to find a balance. For example, one embodiment of the present disclosure includes partitioning a single image at different tiling resolutions and encoding the image using the method described herein. The image is 4096×4096 spatial resolution and the network model is trained on a down-sampled image of 2048×2048 resolution and validated at full resolution. In some cases, tiles with smaller resolution lead to higher reconstruction PSNR, but relatively poor interpolation. In an example experiment, tiles with 32×32 resolution result in superior reconstruction quality for validation samples.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for signal processing, comprising:
receiving a digital signal comprising signal values corresponding to discrete sample locations;
generating modulation parameters based on the digital signal using a modulator network, wherein each of a plurality of modulator layers of the modulator network outputs a set of the modulation parameters; and
generating a predicted signal value of the digital signal at an additional location using a synthesizer network, computing, at a first synthesizer layer, a product of a set of modulation parameters output by a modulator layer and a continuous function of a first set of features to produce a second set of features, wherein the second set of features are input to a second synthesizer layer, wherein each of a plurality of synthesizer layers of the synthesizer network operates based on the set of the modulation parameters from a corresponding modulator layer of the modulator network.

2. The method of claim 1, further comprising:
encoding at least a portion of a digital image to produce a latent vector, wherein the modulation parameters are generated based on the latent vector.

3. The method of claim 2, wherein:
the discrete set original sample locations correspond to pixel location within the digital image, and the predicted signal value comprises color values at the additional location.

4. The method of claim 2, further comprising:
inpainting at least one pixel of the digital image based on the predicted signal value, wherein the additional location comprises a location of the inpainted at least one pixel.

5. The method of claim 2, further comprising:
generating a refined digital image based on the predicted signal value, wherein the refined digital image comprises a higher resolution than the digital image.

6. The method of claim 1, further comprising:
interpolating an intermediate frame of a digital video based on the predicted signal value to produce an updated digital video with a higher frame rate than the digital video, wherein the digital signal comprises the digital video.

7. The method of claim 1, wherein:
the digital signal comprises a digital audio signal.

8. The method of claim 1, wherein:
the digital signal comprises a three dimensional (3D) image, and the original signal values represent distances from a surface of the 3D image.

9. The method of claim 1, wherein:
the continuous function comprises a sine function, and the product comprises a Hadamard product.

10. The method of claim 1, wherein:
the modulator network and the synthesizer network are trained based on training signals other than the digital signal.

11. The method of claim 1, wherein:
the discrete set of original sample locations does not include the additional location.

12. An apparatus for signal processing, comprising:
at least one processor;
at least one memory;
a modulator network comprising a plurality of modulator layers, wherein each of the plurality of modulator layers of the modulator network is configured to output a different set of modulation parameters based on a same digital signal;
an encoder configured to produce a latent vector representing the digital signal, wherein the modulator network takes the latent vector as input; and
a synthesizer network comprising a plurality of synthesizer layers, wherein the synthesizer network represents a continuous function of a signal parameter of the digital signal, and wherein each of the synthesizer layers is configured to receive the set of modulation parameters from a corresponding modulator layer of the modulator network.

13. The apparatus of claim 12, wherein:
the modulator layers comprise multi-layer perceptron (MLP) layers with rectified linear unit (ReLU) activation.

14. The method of claim 12, wherein:
the synthesizer layers comprise MLP layers with sine function activation.

15. A method for training a neural network, comprising:
receiving a digital signal comprising signal values corresponding to discrete sample locations;
generating modulation parameters based on the digital signal using a modulator network, wherein each of a plurality of modulator layers of the modulator network outputs a set of the modulation parameters, encoding the digital signal to produce a latent vector, wherein the modulator network takes the latent vector as input to produce the modulation parameters;
generating a predicted signal value of the digital signal for at least one of the original sample locations using a synthesizer network, wherein each of a plurality of synthesizer layers of the synthesizer network receives the set of the modulation parameters from a corresponding modulator layer of the modulator network;
computing a loss function based on the predicted signal value and a value of the original signal values corresponding to the at least one of the original sample locations; and
training the modulator network and the synthesizer network based on the loss function.

16. The method of claim 15, wherein:
the predicted signal values correspond to predicted color values of a training image at pixel locations corresponding to the original sample locations.

17. The method of claim 15, wherein:
the training is based on an auto-encoder training process.

* * * * *